Patented Oct. 3, 1944

2,359,622

UNITED STATES PATENT OFFICE 2,359,622

ESTER-ETHERS OF BIS-PHENOLS

Gerald H. Coleman and Bartholdt C. Hadler, Midland, Mich., and Robert W. Sapp, Wilmington, Del., assignors to The Dow Chemical Company, Midland, Mich., a corporation of Michigan No Drawing. Original application November 7, 1940, Serial No. 364,688. Divided and this application August 28, 1943, Serial No. 500,428

8 Claims. (Cl. 260—483)

This invention concerns certain new ester-ethers of bis-phenols and a method of making the same. By a "bis-phenol" is meant a dihydric phenolic compound formed by condensing an aldehyde or a ketone with two molecular equivalents of a monohydric phenol of the benzene series.

The bis-phenols of which the new ester-ethers are derivatives have the general formula:

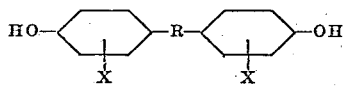

wherein R represents an alkylidene of a cycloalkylidene radical and X represents hydrogen or an alkyl radical. In producing the ester-ether products of this invention, a bis-phenol is etherified to form a corresponding di-hydroxyalkyl ether of the bis-phenol and the di-hydroxyalkyl ether is esterified to obtain the final ester-ether product.

Di-hydroxyalkyl ethers of bis-phenols, which ethers have the general formula:

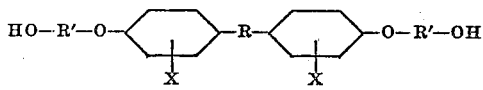

wherein R and X have the above meanings and R' is an alkylene radical, may be prepared by the direct reaction of an alkylene oxide, e. g. ethylene oxide, propylene oxide, or butylene oxide, etc., with a bis-phenol. The reaction may be carried out by heating the bis-phenol, preferably with stirring, at a reaction temperature between 125° and 170° C. and passing the olefine oxide into the heated bis-phenol until the desired amount of olefine oxide has been absorbed. If desired, a catalyst such as sodium or potassium hydroxide, or a basic amine, or acids such as sulphuric or phosphoric acid, etc., may be employed in small proportion to promote the reaction, but the use of a catalyst is not required. The product may be separated by distilling low-boiling ingredients, e. g. unreacted olefine oxide and bis-phenol, from the mixture.

However, di-hydroxyalkyl ethers of bis-phenols having the above general formula are preferably prepared by reacting an olefine halohydrin, e. g. ethylene chlorohydrin, ethylene bromohydrin, propylene chlorohydrin, propylene bromohydrin, or a butylene chlorohydrin, etc., with an alkali metal salt of a bis-phenol. The reaction is carried out by heating a sodium or potassium salt of a bis-phenol, or a mixture of the bis-phenol and sufficient sodium or potassium hydroxide to form such salt, and an olefine halohydrin to a reaction temperature in the presence of water, alcohol, or other suitable liquid medium. Approximately 2 moles of the olefine halohydrin are preferably employed per mole of the bis-phenol or its alkali metal salt, but the halohydrin may be employed in smaller or larger proportion if desired. The reaction is usually carried out at temperatures between 60° and 120° C., but it may in some instances be carried out at lower or higher temperatures. The reaction is usually complete after from 1 to 6 hours of heating at temperatures within the range just given. The product may be separated by conventional purification procedure, e. g. by washing the reacted mixture with water to extract alkali metal halide, e. g. sodium chloride, therefrom and then heating under vacuum to distill any lower boiling ingredients from the product. The hydroxy-alkyl ethers of bis-phenols thus prepared vary at room temperature from extremely viscous liquids to noncrystalline resinous solids to solids which may be crystallized.

The ester-ethers (i. e. acyloxy-alkyl ethers) of bis-phenols are prepared by esterifying the above di-hydroxyalkyl ethers of the bis-phenols. They have the general formula:

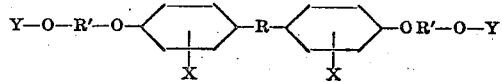

wherein Y represents an acyl radical, e. g. an acetyl, propionyl, butryl, crotonyl, levulinyl, benzoyl, naphthoyl, or cinnamoyl radical, etc., and R, R', and X have the meanings hereinbefore given. The esterification is carried out in accordance with usual esterification procedure, e. g. by heating a mixture of the hydroxy-alkyl ether of a bis-phenol and an organic carboxylic acid under reflux in the presence of an esterification catalyst, such as hydrochloric acid, sulphuric acid, or benzene sulphonic acid, etc. Water may advantageously be distilled from the mixture as it is formed. The removal of water during the reaction may be facilitated by carrying the esterification out in the presence of a volatile water-immiscible solvent, such as benzene, ethylene chloride, carbon tetrachloride, etc., which will distill together with the water at temperatures below the boiling point of water alone. After completing the reaction, the ester product is separated as usual, e. g. by distillation.

The acyloxy-alkyl ethers of bis-phenols so obtained are usually extremely viscous liquids or noncrystalline resinous solids at room temperature, although they may in some instances be obtained in crystalline form. They are highly effective as plasticizing agents and are particularly useful as agents for plasticizing thermoplastic resins so as to increase their moldability without unduly softening them at room temperature.

The following examples describe a number of ways in which the principle of the invention has been applied, but are not to be construed as limiting the invention.

Example 1

A mixture of 1 gram mole of 2.2-di-(4-hydroxyphenyl-) propane, 2.25 gram moles of sodium hydroxide, 400 cc. of water and 300 cc. of ethyl alcohol was heated under reflux at temperatures between 80° and 85° C., and 2.25 gram moles of ethylene chlorohydrin was added gradually during a period of 0.5 hour. Heating was continued for an additional 3.5 hours after which the mixture was washed with water and the low-boiling ingredients were distilled from the product under vacuum. The residual material was recrystallized from benzene. There was obtained 0.94 gram mole of 2.2-di-(4-beta-hydroxy-ethoxy-phenyl) propane as a nearly white crystalline solid having a melting point of approximately 112° C. The product has the formula:

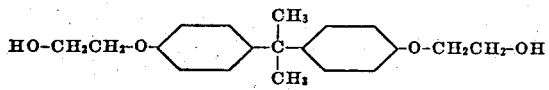

Example 2

A mixture of 1140 grams of 2.2-di-(4-hydroxyphenyl-) propane, 236 grams of sodium hydroxide, 250 cc. of water and 1200 cc. of 95 per cent concentrated ethyl alcohol was heated to about 70° C. and an aqueous solution of 970 grams of propylene chlorohydrin and 1010 grams of water was added over a period of 1 hour and 10 minutes. The temperature varied from 70° to 80° C. during the addition. The mixture stood over night, after which it was treated with an additional 20 grams of sodium hydroxide and heated to a temperature of 82°–83° C. for 4.5 hours. The mixture was then cooled to approximately room temperature, whereupon it separated into layers. The organic layer was separated from the aqueous alcohol layer and was washed consecutively with a 20 per cent sodium hydroxide solution and water and then dried. There were obtained 314 grams of product in the form of an extremely viscous brown liquid which was insoluble in aqueous sodium hydroxide solutions. The product consisted substantially of 2.2-di-(4-hydroxypropoxy-phenyl-)propane, having the formula:

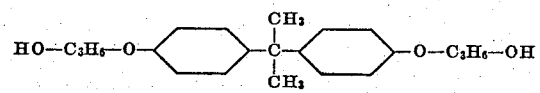

Example 3

A mixture of 0.3 gram mole of 1.1-di-(4-hydroxy-phenyl-)butane, 0.675 gram mole of sodium hydroxide, and 200 cc. of water was heated under reflux at temperatures between 85° and 95° C., and 0.675 gram mole of ethylene chlorohydrin was added gradually during a period of 0.5 hour. Heating was continued for an additional 3.5 hours, after which the mixture was washed with water and the low-boiling ingredients were distilled from the product under vacuum. There was obtained 0.268 gram mole of 1.1-di-(4-hydroxy-ethoxy-phenyl)butane in the form of a soft noncrystalline solid. The product has the formula:

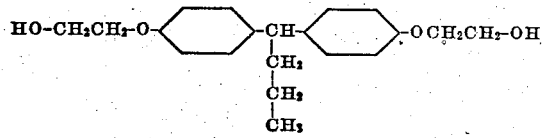

Example 4

A mixture of 0.3 gram mole of 2.2-di-(4-hydroxy-phenyl)butane, 0.675 gram mole of sodium hydroxide and 200 cc. of water was heated under reflux at approximately 90° C. and 0.675 gram mole of ethylene chlorohydrin was added thereto in 15 minutes. Heating at approximately 90° C. was continued for an additional 3.5 hours. The product was then separated as in Example 2. There was obtained 0.264 gram mole of 2.2-di(4-beta-hydroxyethoxy-phenyl)-butane in the form of an extremely viscous liquid at room temperature. The product has the formula:

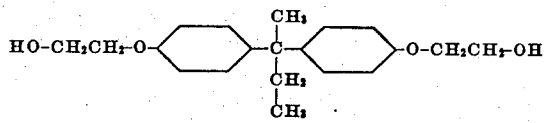

Example 5

A mixture of 0.3 gram mole of 2.2-di-(3-methyl-4-hydroxyphenyl)propane, 0.675 gram mole of sodium hydroxide, and 200 cc. of water was heated under reflux to approximately 90° C., and 0.675 gram mole of ethylene chlorohydrin was added thereto in about 15 minutes. Heating at temperatures between 90° and 95° C. was continued for an additional 3.5 hours after which the product was separated as in Example 2. There was obtained 0.17 gram mole of 2.2-di-(3-methyl-4-beta-hydroxyethoxy-phenyl)propane in the form of an extremely viscous reddish-brown liquid. The product has the formula:

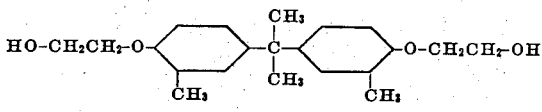

Example 6

A mixture of 0.399 gram mole of 1.1-di-(4-hydroxy-phenyl-)cyclohexane, 0.675 mole of sodium hydroxide, 300 cc. of water and 25 cc. of ethyl alcohol was heated under reflux to about 90° C. and 0.675 gram mole of ethylene chlorohydrin was added gradually in about 35 minutes. The mixture was heated with stirring at temperatures between 90° and 93° C. for an additional 3.5 hours. The mixture was then diluted with 500 cc. of ethylene chloride, and the solution was washed successively with dilute aqueous sodium hydroxide solution and water. The ethylene chloride and other low-boiling ingredients were then distilled from the product, the distillation being completed under vacuum. There was obtained 0.332 gram mole of 1.1-di-(4-beta-hydroxyethoxy - phenyl - ) - cyclohexane in the form of a cream-colored non-crystalline solid which was quite brittle at room temperature. The product has the formula:

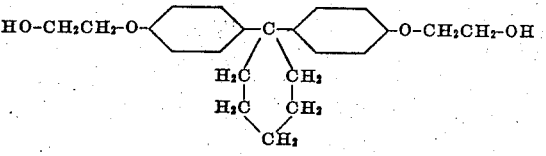

Example 7

The 2.2-di(4-beta-hydroxyethoxy-phenyl-)propane obtained in Example 1 was esterified by heating a mixture of 0.15 gram mole of the same, 0.3 gram mole of cinnamic acid, 5 grams of benzenesulphonic acid, and 150 cc. of benzene under reflux at temperatures between 80 and 85° C. for 4 hours 15 minutes. During the heating, a mixture of benzene and the water formed by the reaction was distilled from the mixture. The reacted mixture was neutralized with aqueous sodium hydroxide, washed with water, and subjected to distillation under vacuum for the purpose of removing lower-boiling materials from the ester product. The latter was then recrystallized from di-isopropyl ether. There was obtained 0.5 gram mole of 2.2-di-(4-(beta-cinnamoyloxy - ethoxy - )phenyl - )propane as a nearly white crystalline solid having a melting point of 105°–106.5° C. The product has the formula:

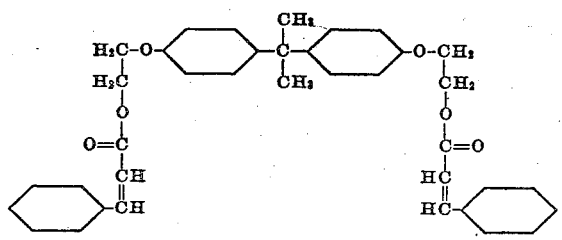

*Example 8*

A mixture of 0.5 gram mole of 2.2-di-(4-beta-hydroxy-ethoxy-phenyl-)propane, 1 gram mole of crotonic acid, 5 grams of benzene sulphonic acid, and 400 cc. of benzene was heated under reflux at temperatures between 83° and 86° C. for 15 hours, 15 minutes, a mixture of benzene and water formed by the esterification being distilled off during the heating. The reacted mixture was washed successively with a dilute aqueous sodium hydroxide solution and water after which the product was separated by distillation. There was obtained approximately 0.5 gram mole of 2.2-di-(4-(beta - crotonyloxy-ethoxy-)-phenyl-)propane as a viscous yellow liquid distilling at temperatures between 225° and 275° C. at 1 millimeter absolute pressure and having a specific gravity of approximately 1.132 at 25° C. with respect to water at the same temperature. The product has the formula:

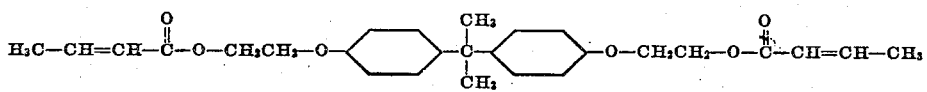

*Example 9*

A mixture of 0.5 gram mole of 2.2-di-(beta-hydroxy-ethoxy-phenyl)propane, 1 gram mole of levulinic acid, 5 grams of benzene sulphonic acid and 350 cc. of benzene was heated under reflux at temperatures between 82° and 90° C. for 2.5 hours, water and benzene being distilled therefrom during the heating. The mixture was then washed with an aqueous sodium hydroxide solution and water after which low-boiling ingredients were distilled from the product under vacuum. There was obtained 0.42 gram mole of 2.2-di-(4 -(beta-levulinyloxy - ethoxy-)phenyl-)-propane in the form of an amber-colored viscous liquid having a specific gravity of approximately 1.166 at 25° C. The product has the formula:

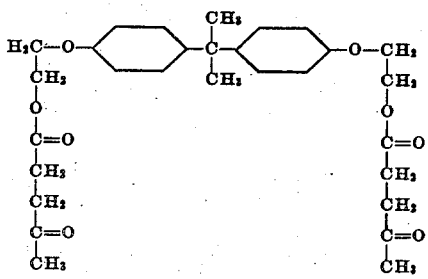

*Example 10*

A mixture of 0.172 gram mole of 2.2-di-(4-beta-hydroxy-ethoxy-phenyl)-butane, 0.346 gram mole of glacial acetic acid, 5 grams of benzene sulphonic acid, and 250 cc. of benzene was heated under reflux at temperatures between 78° and 84° C. for 2 hours, water and benzene being distilled therefrom during the heating. The ester product was then separated as in Example 7. There was obtained 0.138 gram mole of 2.2-di-(4-(beta - acetyloxy - ethoxy-phenyl)propane in the form of a viscous yellow liquid which distilled at temperatures between 240° and 245° C. at 1 millimeter absolute pressure and had a specific gravity approximately 1.144 at 25° C. The product has the formula:

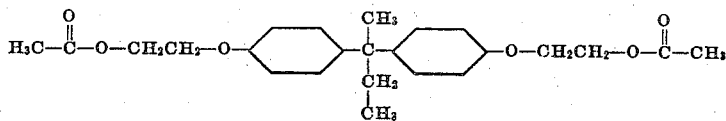

*Example 11*

A mixture of 0.1 gram mole of cyclohexylidene-4.4'-bis-(beta-phenoxy-ethanol), 0.2 gram mole of benzoic acid, 5 grams of benzene sulphonic acid and 250 cc. of benzene was heated under reflux at temperatures between 82° and 90° C. for 7 hours 45 minutes, while distilling benzene and water formed by the reaction therefrom. The ester product was then separated as in Example 7. There was obtained 0.04 gram mole of 1.1-di-(4-beta - benzoxy - ethoxy-)phenyl-)cyclohexane as a soft amber-colored resin. The product has the formula:

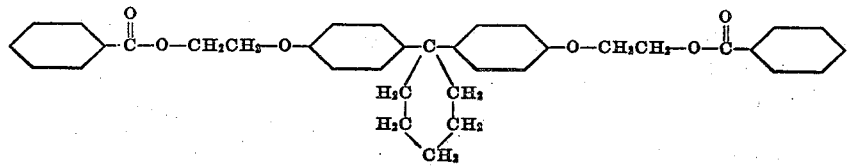

*Example 12*

A mixture of 137 grams of the 2.2-di-(4-hydroxy-propoxy-phenyl-)propane obtained in Example 2, 60 grams of glacial acetic acid, 250 cc. of benzene, and 5 grams of benzene sulphonic acid was heated at temperatures which varied from 86° to 92° C. for 3 hours, while continuously distilling off a mixture of benzene and the water formed by the reaction and separating benzene from the distillate and returning it to the reaction mixture. The mixture was then cooled, washed with 250 cc. of a saturated aqueous sodium bicarbonate solution and then with approximately 1 liter of water. The mixture was then distilled, first at atmospheric pressure to remove the benzene and thereafter under vacuum to separate the ester product. There was obtained 135 grams of a highly viscous, slightly yellow liquid ester-ether which distilled at 235°–245° C. at 1 millimeter pressure with some decomposition and which had a specific gravity of about 1.108 at 25° C. with respect to water at 4° C. The ester-ether product is 2.2-di(4-(acetyloxy-propoxy-)phenyl-)propane, having the formula:

$$H_3C-\overset{O}{\overset{\|}{C}}-O-C_3H_6-O-\underset{}{\bigcirc}-\underset{CH_3}{\overset{CH_3}{\underset{|}{\overset{|}{C}}}}-\underset{}{\bigcirc}-O-C_3H_6-O-\overset{O}{\overset{\|}{C}}-CH_3$$

Other hydroxy-ethers and ester-ethers of bis-phenols may be prepared by similar procedure. For instance, an alkali metal salt of the bis-phenol, 2.2-di(3-ethyl-4-hydroxy-phenyl-)propane, may be reacted with an olefine halohydrin, e. g. ethylene chlorohydrin, propylene chlorohydrin, or butylene chlorohydrin, to form a corresponding hydroxy-alkyl ether of the bis-phenol, i. e. a hydroxy-ethyl ether, a hydroxy-propyl ether, or a hydroxy-butyl ether of the bis-phenol, and the hydroxy-ether may be reacted with a carboxylic acid, e. g. acetic acid, propionic acid, or benzoic acid, etc., to form a corresponding ester-ether of the bis-phenol.

This application is a division of our copending application, Serial No. 364,688, filed November 7, 1940 and which has now matured into Patent Number 2,331,265.

Other modes of applying the principle of the invention may be employed instead of those explained, changes being made as regards the method or compounds herein disclosed, provided the steps or compounds stated by any of the following claims or the equivalent of such stated steps or compounds be employed.

We therefore particularly point out and distinctly claim as our invention:

1. An ester-ether having the general formula:

$$Y-O-R'-O-\underset{X}{\bigcirc}-R-\underset{X}{\bigcirc}-O-R'-O-Y$$

wherein R represents a radical selected from the class consisting of alkylidene and cycloalkylidene radicals, R' represents an alkylene radical, X represents a member of the group consisting of hydrogen and alkyl radicals, and Y represents an acyl radical of a carboxylic acid.

2. An ester-ether having the general formula:

$$Y-O-R'-O-\bigcirc-R-\bigcirc-O-R'-O-Y$$

wherein R represents an alkylidene radical, R' represents an alkylene radical, and Y represents an acyl radical of a carboxylic acid.

3. An ester-ether having the general formula:

$$Y-O-R'-O-\bigcirc-\underset{CH_3}{\overset{CH_3}{\underset{|}{\overset{|}{C}}}}-\bigcirc-O-R'-O-Y$$

wherein R' represents an alkylene radical and Y represents an acyl radical of a carboxylic acid.

4. An ester-ether having the general formula:

$$H_3C-\overset{O}{\overset{\|}{C}}-O-R'-O-\bigcirc-\underset{CH_3}{\overset{CH_3}{\underset{|}{\overset{|}{C}}}}-\bigcirc-O-R'-O-\overset{O}{\overset{\|}{C}}-CH_3$$

wherein R' represents an alkylene radical.

5. 2.2-di-(4-(acetyloxy-propoxy-)phenyl-)propane, having the formula:

$$H_3C-\overset{O}{\overset{\|}{C}}-O-C_3H_6-O-\bigcirc-\underset{CH_3}{\overset{CH_3}{\underset{|}{\overset{|}{C}}}}-\bigcirc-O-C_3H_6-O-\overset{O}{\overset{\|}{C}}-CH_3$$

6. An ester-ether having the general formula:

$$Y-O-CH_2CH_2-O-\bigcirc-\underset{CH_3}{\overset{CH_3}{\underset{|}{\overset{|}{C}}}}-\bigcirc-O-CH_2CH_2-O-Y$$

wherein Y is an acyl radical of a carboxylic acid.

7. 2.2-di-(4-(beta-crotonyloxy-ethoxy-)phenyl-propane, having the formula:

$$H_3C-CH=CH-\overset{O}{\overset{\|}{C}}-O-CH_2CH_2-O-\bigcirc-\underset{CH_3}{\overset{CH_3}{\underset{|}{\overset{|}{C}}}}-\bigcirc-O-CH_2CH_2-O-\overset{O}{\overset{\|}{C}}-CH=CH-CH_3$$

8. 2.2-di-(4-(beta-levulinyloxy-ethoxy-)phenyl-)propane, having the formula:

$$CH_3\overset{O}{\overset{\|}{C}}CH_2CH_2\overset{O}{\overset{\|}{C}}-O-CH_2CH_2-O-\bigcirc-\underset{CH_3}{\overset{CH_3}{\underset{|}{\overset{|}{C}}}}-\bigcirc-O-CH_2CH_2-O-\overset{O}{\overset{\|}{C}}-CH_2CH_2\overset{O}{\overset{\|}{C}}-CH_3$$

GERALD H. COLEMAN.
BARTHOLDT C. HADLER.
ROBERT W. SAPP.